(12) United States Patent
Cohan et al.

(10) Patent No.: US 11,170,158 B2
(45) Date of Patent: Nov. 9, 2021

(54) ABSTRACTIVE SUMMARIZATION OF LONG DOCUMENTS USING DEEP LEARNING

(71) Applicant: Adobe Inc., San Jose, CA (US)

(72) Inventors: Arman Cohan, Washington, DC (US);
Walter W. Chang, San Jose, CA (US);
Trung Huu Bui, San Jose, CA (US);
Franck Dernoncourt, San Jose, CA (US);
Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 202 days.

(21) Appl. No.: 15/915,775

(22) Filed: Mar. 8, 2018

(65) Prior Publication Data
US 2019/0278835 A1 Sep. 12, 2019

(51) Int. Cl.
| | | |
|---|---|---|
| *G06F 40/14* | (2020.01) | |
| *G06F 40/146* | (2020.01) | |
| *G06N 3/04* | (2006.01) | |
| *G06F 16/93* | (2019.01) | |
| *G06F 16/34* | (2019.01) | |

(Continued)

(52) U.S. Cl.
CPC .......... *G06F 40/146* (2020.01); *G06F 16/345* (2019.01); *G06F 16/93* (2019.01); *G06F 40/274* (2020.01); *G06F 40/289* (2020.01); *G06F 40/30* (2020.01); *G06F 40/56* (2020.01); *G06N 3/0445* (2013.01); *G06N 3/0454* (2013.01)

(58) Field of Classification Search
CPC .... G06F 17/2252; G06F 16/93; G06F 16/345; G06F 17/276; G06F 17/2775; G06F 17/2785; G06F 17/2881; G06F 40/146; G06F 40/56; G06F 40/289; G06F 40/30; G06F 40/274; G06N 3/0454; G06N 3/0445
USPC ........................................................ 715/242
See application file for complete search history.

(56) References Cited

U.S. PATENT DOCUMENTS 9,256,826 B2  2/2016  Srinivasan et al.
9,426,170 B2  8/2016  Srinivasan et al.
(Continued)

OTHER PUBLICATIONS

Nallapati, Zhai, and Zhou,"SummaRuNNer: A Recurrent Neural Network based Sequence Model for Extractive Summarization of Documents", Nov. 14, 2016, https://arxiv.org/pdf/1611.04230.pdf (Year: 2016).*

(Continued)

*Primary Examiner* — Hope C Sheffield
(74) *Attorney, Agent, or Firm* — Finch & Maloney PLLC

(57) ABSTRACT

Techniques are disclosed for abstractive summarization process for summarizing documents, including long documents. A document is encoded using an encoder-decoder architecture with attentive decoding. In particular, an encoder for modeling documents generates both word-level and section-level representations of a document. A discourse-aware decoder then captures the information flow from all discourse sections of a document. In order to extend the robustness of the generated summarization, a neural attention mechanism considers both word-level as well as section-level representations of a document. The neural attention mechanism may utilize a set of weights that are applied to the word-level representations and section-level representations.

20 Claims, 9 Drawing Sheets

(51) Int. Cl.
*G06F 40/30* (2020.01)
*G06F 40/56* (2020.01)
*G06F 40/274* (2020.01)
*G06F 40/289* (2020.01)

(56) References Cited

U.S. PATENT DOCUMENTS

| | | | |
|---|---|---|---|
| 9,607,273 | B2 | 3/2017 | Srinivasan et al. |
| 9,734,451 | B2 | 8/2017 | Srinivasan et al. |
| 9,852,239 | B2 | 12/2017 | Natarajan et al. |
| 9,965,766 | B2 | 5/2018 | Srinivasan et al. |
| 10,074,102 | B2 | 9/2018 | N et al. |
| 10,102,191 | B2 | 10/2018 | Srinivasan et al. |
| 10,373,057 | B2 | 8/2019 | Emrah et al. |
| 10,380,236 | B1 * | 8/2019 | Ganu ............... G06F 17/277 |
| 10,474,709 | B2 | 11/2019 | Romain |
| 10,740,678 | B2 | 8/2020 | Kam et al. |
| 2016/0196354 | A1 | 7/2016 | Srinivasan et al. |
| 2017/0024807 | A1 | 1/2017 | Harsh et al. |
| 2017/0127132 | A1 | 5/2017 | Sumit et al. |
| 2017/0220587 | A1 | 8/2017 | Srinivasan et al. |
| 2017/0230387 | A1 | 8/2017 | Srinivasan et al. |
| 2017/0309194 | A1 * | 10/2017 | Simske ............. G09B 5/065 |
| 2018/0011931 | A1 | 1/2018 | Modani et al. |
| 2018/0039898 | A1 | 2/2018 | Saini et al. |
| 2018/0060287 | A1 | 3/2018 | Srinivasan et al. |
| 2018/0075128 | A1 | 3/2018 | Srinivasan et al. |
| 2018/0225471 | A1 | 8/2018 | Tanya et al. |
| 2018/0276725 | A1 | 9/2018 | Srinivasan et al. |
| 2018/0300400 | A1 * | 10/2018 | Paulus ............. G06F 16/345 |
| 2018/0329883 | A1 | 11/2018 | Leidner et al. |
| 2019/0043379 | A1 * | 2/2019 | Yuan ............... G09B 7/02 |
| 2019/0236139 | A1 * | 8/2019 | DeFelice ............. G06N 7/005 |
| 2019/0266246 | A1 * | 8/2019 | Wang ............... G10L 15/28 |

OTHER PUBLICATIONS

Zhenpeng Zhou, "A Hierarchical Model for Text Autosummarization", Jun. 19, 2016, Stanford University, http://cs224d.stanford.edu/reports/zhenpeng.pdf, pp. 1-7 (Year: 2016).*
Nallapati, Zhou, dos Santos, Gulcehre, Xiang, "Abstractive Text Summarization using Sequence to sequence RNNs and Beyond", arXiv, Aug. 26, 16, pp. 1-12 (Year: 2016).*
Wu, Schuster, Chen, Le, Norouzi, "Google's Neural Machine Translation System: Bridging the Gap between Human and Machine Translation", arxiv, Oct. 8, 2016, pp. 1-23 (Year: 2016).*
Hasselqvist, Helmertz, Kageback, "Query-based Abstractive Summarization Using Neural Networks", Chalmer University of Technology, Dec. 17, 2017, pp. 1-11 (Year: 2017).*
Chopra, S. et al., "Abstractive Sentence Summarization with Attentive Recurrent Neural Networks", Proceedings of NAACL-HLT, pp. 93-98 (2016).
Erkan, G. et al., "LexRank: Graph-Based Lexical Centrality as Salience in Text Summarization", AI Access Foundation, 24 pages (2004).
Gu, J. et al., "Incorporating Copying Mechanism in Sequence-to-Sequence Learning", In Proceedings of the 54th Annual Meeting of the Asociation for Computational Linguistics, Berlin, Germany: Association for Computational Linguistics, pp. 1631-1640 (2016).
Gulcehre, C. et al., "Pointing the Unknown Words", arXiv:1603.08148v3, 10 pages (Aug. 21, 2016).
Hermann, K.M. et al., "Teaching Machines to Read and Comprehend", arXiv:1506.03340v3, 14 pages (Nov. 19, 2015).
Nallapati, R. et al., "Abstractive Text Summarization Using Sequence-to-Sequence RNNs and Beyond", arXiv:1602 06023v5, 12 pages (Aug. 26, 2016).
Nallapati, R. et al., "SummaRuNNer?: A Recurrent Neural Network Based Sequence Model for Extractive Summarization of Documents", arXiv:1611 04230v1, 7 pages (Nov. 14, 2016).
Paulus, R. et al., "A Deep Reinforced Model for Abstractive Summarization", arXiv:1705.04304v3, 12 pages (Nov. 13, 2017).
Rush, A. et al., "A Neural Attention Model for Abstractive Sentence Summarization", arXiv:1509.00685v2, 11 pages (Sep. 3, 2015).
Sandhaus, Evan, "The New York Times Annotated Corpus Overview, LDC2008T19", The New York Times Research & Development, Linguistic Data Consortium, 22 pages (2008).
See, A. et al., "Get To The Point: Summarization with Pointer-Generator Networks", arXiv:1704.04368v2, 20 pages (Apr. 25, 2017).
Steinberger, J. et al., "Using Latent Semantic Analysis in Text Summarization and Summary Evaluation", In ISIM, pp. 93-100 (2004).
Tu, A. et al., "Modeling Coverage for Neural Machine Translation", arXiv:1601.04811v6, 11 pages (Aug. 6, 2016).
Vanderwende, L. et al., "Beyond SumBasic: Task-Focused Summarization with Sentence Simplification and Lexical Expansion", ScholarlyCommons: http://repository.upenn.edu/cis_papers/736, 16 pages (Jan. 2007).
Vinyals, O. et al., "Show and Tell: A Neural Image Caption Generator", In Proceedings of the IEEE Conference on Computer Vision and Pattern Recognition, pp. 3156-3164 (2015).
Zhou, Q. et al., "Selective Encoding for Abstractive Sentence Summarization", arXiv:1704.07073v1, 10 pages (Apr. 24, 2017).
Cho, K. et a., "Learning Phrase Representations using RNN Encoder-Decoder for Statistical Machine Translation", arXiv:1406 1078v3 [cs.CL] Sep. 3, 2014, 15 pages.
Bahdanau, D. et al., "Neural Machine Translation By Jointly Learning To Align and Translate", arXiv:1409.0473v7 [cs.CL] May 19, 2016, 15 pages.
Sutskever, I. et al., "Sequence to Sequence Learning with Neural Networks", arXiv:1409.3215v3 [cs.CL] Dec. 14, 2014, 9 pages.
Britz, "Recurrent Neural Networks Tutorial, Part 1—Introduction to RNNs", WildML, retrieved from http://www.wildml.com/2015/09/recurrent-neural-networks-tutorial-part-1-introduction-to-rnns (posted Sep. 17, 2015).
Olah, "Understanding LSTM Networks", colah's blog, retrieved from http://colah.github.io/posts/2015-08-Understanding-LSTMs (posted Aug. 27, 2015).
Li, Z. et al., "Paraphrase Generation with Deep Reinforcement Learning", arXiv:1711.00279v2, Jan. 12, 2018, 20 pages.
Examination Report received in Australia Patent Application 2018271417, dated Sep. 8, 2021, 6 pages.

* cited by examiner $$o_t = \sigma(W_o \cdot [h_{t-1}, x_t] + b_o)$$
$$h_t = o_t * \tanh(C_t)$$

ABSTRACTIVE SUMMARIZATION OF LONG DOCUMENTS USING DEEP LEARNING

FIELD OF THE DISCLOSURE

This disclosure relates to techniques for automatic summarization of long documents. In particular, this disclosure relates to performing automatic summarization of long documents using deep learning techniques.

BACKGROUND

Document summarization has been an active area of research in Natural Language Processing ("NLP") during the past decades. The summarization task is defined as follows: given a textual input document D, generate another text S, so that the length of S is much smaller than length of D but the important points in D are also conveyed by S. Effective summarization not only helps to reduce to amount of time that it takes to understand the main points of a document, but also it is very useful in many other downstream tasks such as question answering and information retrieval.

In general, there are two broad approaches towards summarization: extractive and abstractive. In extractive summarization, S is generated by selecting sentences from the source document D that convey its main points. In contrast, abstractive summarization aims to generate S from scratch and possibly by using words and phrases that are not exactly from the original document D. Robust abstractive summarization is a generally more natural and desirable way of summarizing documents as humans also tend to write abstractive summaries that are in their own words instead of copying exact sentences from the source document.

Most research in document summarization has been focused on summarizing relatively short documents. Existing benchmarks and datasets such as DUC ("Document Understanding Conference") and TAC ("Text Analysis Conference") are obtained from news articles and stories where the document is at most a few pages long and the goal is to generate a short paragraph length summary of the paper. In addition, recent work shows neural networks to be effective tools for sentence summarization, paragraph compression, or relatively short document summarization tasks. In contrast, long form documents such as scientific or enterprise articles are often structured according to a certain discourse template because of their increased length. These differences make summarizing scientific, engineering, enterprise, and other relatively complex documents a challenging problem and existing abstractive methods do not address these problems. In short, effective abstractive summarization methods for long form documents have yet to be developed.

DETAILED DESCRIPTION

Figure 1:
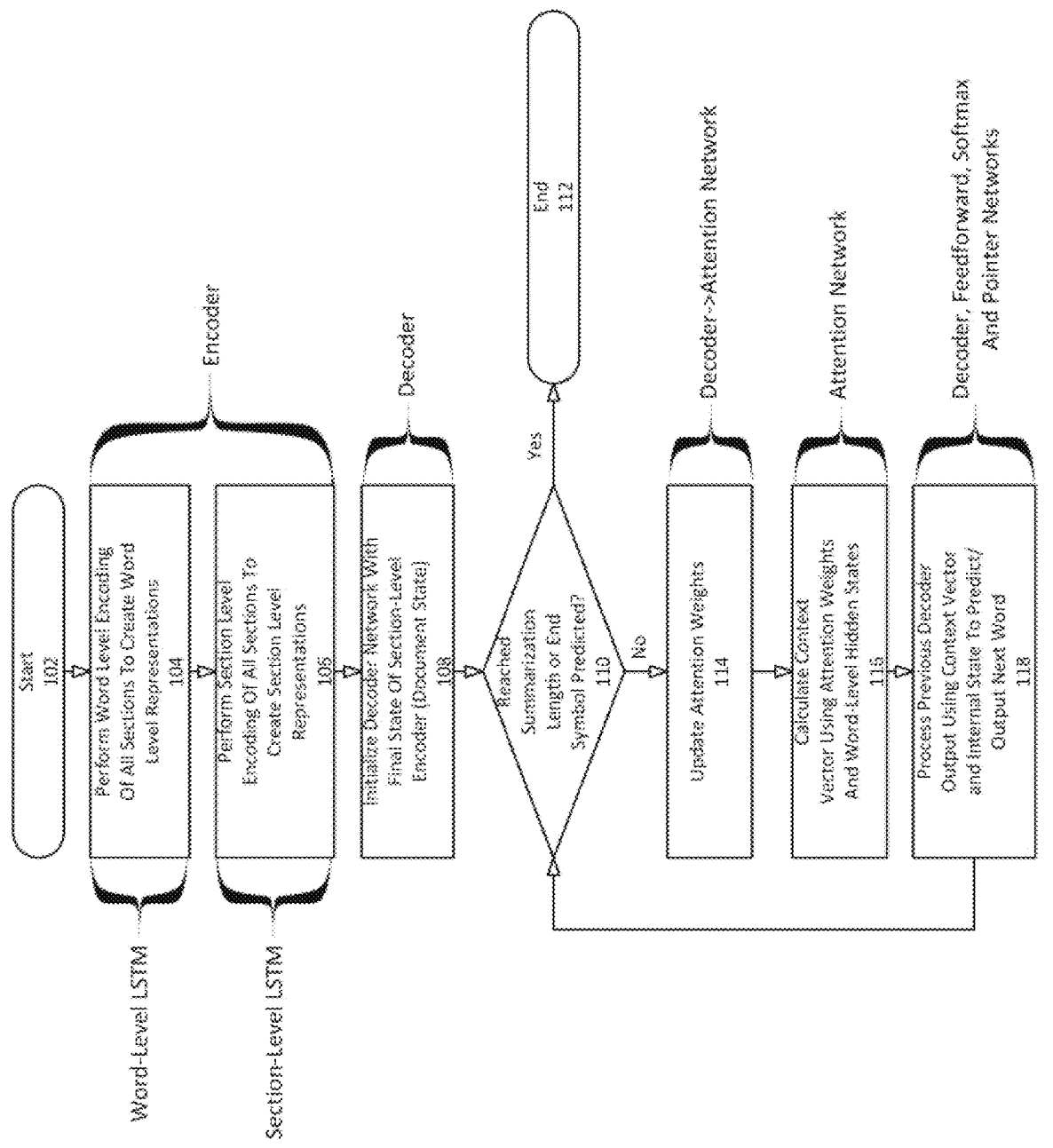
FIG. 1 is a flowchart depicting an operation of a document summarization network according to one embodiment of the present disclosure.

The present disclosure relates to an abstractive summarization process for summarizing documents. The process is particularly well-suited for long and structured documents, but can be used on documents of any length. According to one embodiment of the present disclosure, a document is encoded using a general encoder-decoder architecture with attentive decoding. In particular, an encoder for modeling documents generates both word-level and section-level representations of a document. A discourse-aware decoder then captures the information flow from all discourse sections of a document. In order to extend the robustness of the generated summarization, a neural attention mechanism considers both word-level as well as section-level representations of a document. The neural attention mechanism may utilize a set of weights that are applied to the word-level representations and section-level representations. According to one such embodiment, the weights of neural attention network are computed based upon a scoring function applied to an output of the encoder and decoder weighted by a factor based upon the section-level representations of the document.

As will be appreciated, there are a number of applications for the techniques provided herein, including applications with respect to training of a document summarization system, as well as using such a trained system to generate summaries. For instance, the present disclosure provides techniques for training a machine configured for creation of high quality abstractive summaries for long documents. According to some such embodiments, specialized data construction techniques are employed to create a large-scale dataset of long and structured documents that can subsequently be used for training and evaluating summarization models. In particular, the techniques can be used for constructing a dataset for training and evaluating deep learning methods suitable for long document summarization.

In another embodiment, deep learning methods are applied to address the aforementioned challenges in abstractive summarization of long documents, and in particular, well-known problems of resolving lower frequency important terms and repetition of text during the summary generation phase. According to one such embodiment of the present disclosure, neural abstractive summarization encoder-decoder frameworks are extended by leveraging document structure and handling long documents. The effectiveness of the described techniques for summarizing long form documents provides significant performance advantages over known extractive and abstractive summarization methods.

In yet another embodiment, a document summarization network may comprise a plurality of recurrent neural networks. Due to the fact that temporal dependencies may be many time steps apart, standard RNNs generally may suffer what is known as the exploding/vanishing gradients problem, in which the gradients computed in the backpropagation through time algorithm may become extremely large (exploding) or very small (vanishing), which leads to numerical instabilities, thereby mitigating the effectiveness of RNNs. LSTMs may address the vanishing/exploding gradients problem. Thus, for purposes of this disclosure, it will be understood that the terms RNN and LSTM may be used interchangeably. That, is where an LSTM network is referenced, it will be appreciated that a general RNN may be used instead and that an LSTM merely represents one particular embodiment of an RNN that is used to process time-series or sequential input.

Furthermore, the terms word-level LSTM and section-level LSTM are utilized to refer to particular LSTMs in a document summarization network. It will be appreciated that these terms do not imply any particular structural differences in the composition of the respective LSTMs. Rather, the terms word-level and section-level refer to the nature of processing that these LSTM structures perform (or other RNN structure). In particular, as will become evident below, a word-level LSTM may operate by receiving words in a document section as input to generate a word-level representation of that section. Similarly, a section-level LSTM may operate by receiving as input word-level representations of each section generated by each word-level LSTM to generate a comprehensive representation of the entirety of sections in the document. These terms and the respective operation of various processing elements at the word and section level will be described in more detail below.

FIG. 1 is a flowchart depicting an operation of a document summarization network according to one embodiment of the present disclosure. It is assumed for purposes of this disclosure that a document may comprise a set of sections, each containing a set of words. The process is initiated in 102. The word level and section level encoding at 104 and 106, respectively, may be performed by an encoder block as described below with respect to FIGS. 2-3. In 104, each section in the document is encoded using a respective word-level LSTM associated with each section to create a respective word-level representation/encoding. For purposes of the present disclosure, the term "word-level LSTM" will refer to an LSTM that sequentially receives words in a respective document section as input, updates an internal state and generates an output. As described in more detail below, according to one embodiment of the present disclosure, each word-level LSTM may be a bidirectional LSTM and each respective word-level representation/encoding may be achieved by sequentially providing each word in a document section as input to the respective word-level LSTM associated with that section.

As will be appreciated, and as described in detail below with respect to FIGS. 4a-4g, during each iteration, an LSTM may sequentially update an internal state and generate an output. Thus, as each word in a respective section is provided to a respective LSTM, an internal state associated with that LSTM is updated and an output is generated. As will be appreciated, the internal state and output may each be understood to comprise a tensor, which is well known in the context of deep learning and neural networks. Upon receiving an entire sequence of words comprising a section, the internal state associated with each word-level LSTM reflects a representation of the respective section at the word level. That is, upon processing all words in a section, the internal state of each word-level LSTM may be understood to represent a word-level encoding or representation of a respective document section. The internal state of each word-level LSTM upon receiving all words in a corresponding section is herein referred to as a final state of the word-level LSTM. It will be appreciated that the terms internal state and hidden state may be used interchangeably and refer to an internal tensor representation maintained by an RNN/LSTM that is updated upon each iteration or time step.

According to one embodiment of the present disclosure, at each iterative step performed by each word-level LSTM, the hidden states of each word-level LSTM are cached, as they may be utilized by an attention mechanism to emphasize particular words with respect to a section as will be described below. As will be appreciated, not only does each word-level LSTM at each iteration update an internal state, it also generates an output. For purposes of the present disclosure, the set of outputs of the word-level LSTMs are referred to as word-level outputs.

In 106, the respective word level encodings/representations for each section computed in 104 (internal/hidden states of the word-level LSTMs) are sequentially processed by an RNN/LSTM herein referred to as a section-level LSTM that generates a section level encoding/representation. In particular, according to one embodiment of the present disclosure, after the word-level LSTMs have completed, the internal state of each word-level LSTM is provided as input in a sequential manner to an LSTM herein referred to as a section-level LSTM. This process is performed until all of the final states of the word-level LSTMs have been sequentially provided as input to the section-level LSTM. Upon completion, the internal state of the section-level LSTM represents an encoding or representation of the entire document.

In 108, a decoder network is initialized by setting an internal/hidden state of an LSTM associated with the document to the final internal/hidden state of the section-level LSTM. As will be described with respect to FIGS. 2-3, a decoder network may operate to predict a next word in a document summarization.

Typically, for purposes of generating a summarization, a desired stop condition is that the summarization comprise a particular length (e.g., comprises a particular number of words). According to an alternative embodiment, a special stop symbol in the input may be defined, which upon detection may result in a stop condition being generated. In 110, it is determined whether a stop condition has occurred (e.g., desired summarization length (e.g., measured in words) or a stop symbol has been predicted). If so ('Yes' branch of 110), the process ends in 112.

If not ('No' branch of 110), flow continues with 114, whereby a set of attention weights, which will be used as a neural attention mechanism is updated. As will be described in more detail below, a neural attention mechanism may operate on the set of internal/hidden states of the word-level LSTMs, which have been cached, to cause emphasis upon particular words within a section.

In 116, the word-level LSTM hidden states previously cached are weighted by the attention weights computed in 114 to generate a tensor/vector herein referred to as a context vector. According to one embodiment of the present disclosure, the context vector may be generated as an output of an attention network, which is described below. In particular, the context vector represents an attention-weighted linear combination of word-level representations as computed in 104, wherein the weights comprise those computed in 114.

In 118, a next output word in the document summarization is generated/predicted. According to one embodiment of the present disclosure as described below with respect to FIGS. 2-3, this prediction may be performed by a decoder in combination with a prediction network, wherein the prediction network may include feedforward, soft switch, softmax and pointer networks, which are described in detail below. As will be described below, the decoder may also comprise an LSTM. The feedforward network may comprise a feedforward DNN. Row then continues with 110.

Figure 2:
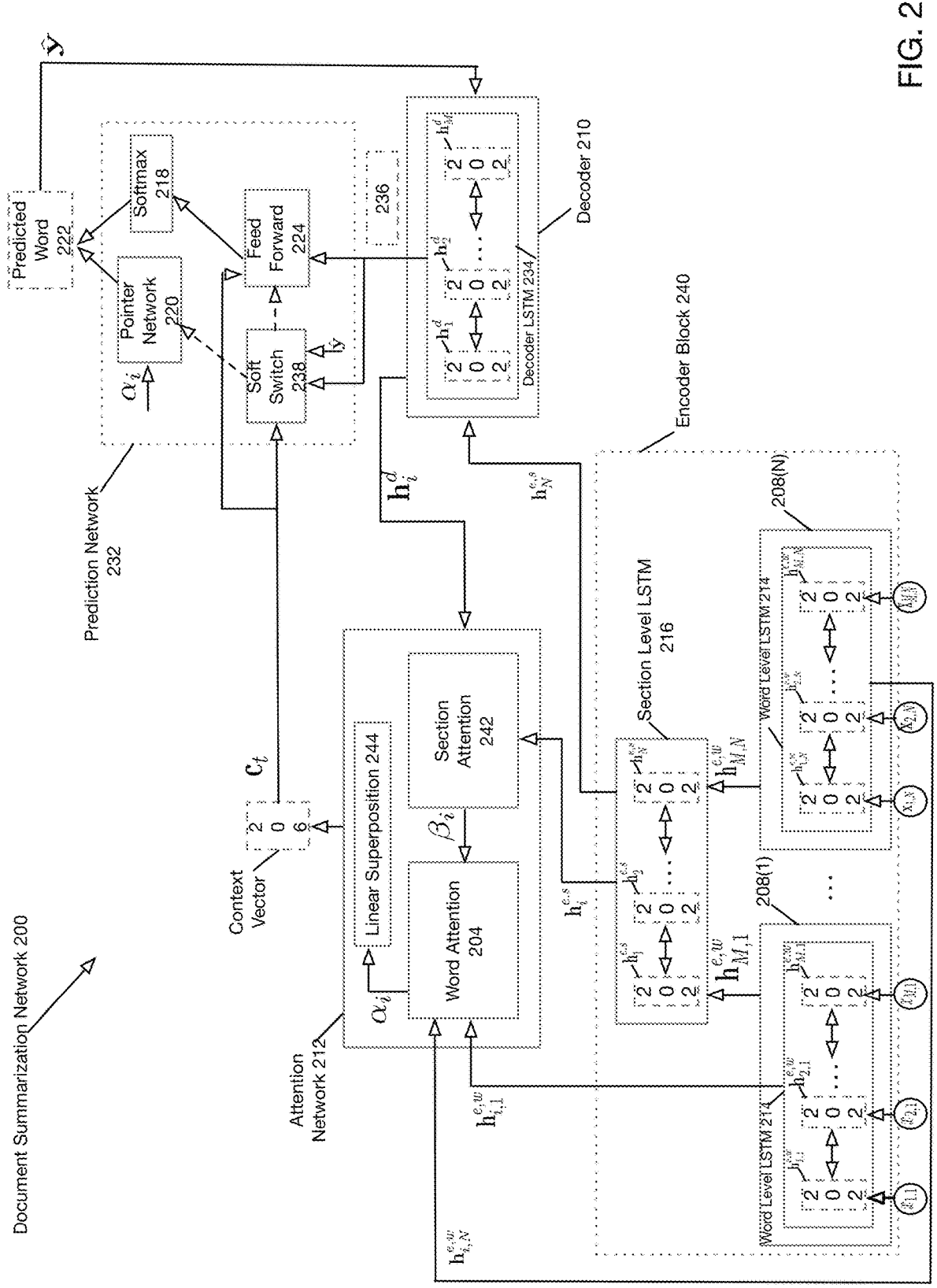
FIGS. 2 and 3 show a block diagram of a document summarization network according to one embodiment of the present disclosure.

FIG. 2 is a high-level block diagram of a document summarization network according to one embodiment of the present disclosure. FIG. 2 depicts the operation of document summarization network 200 at inference or test time. A training operation for document summarization network 200 will be described below with respect to FIG. 3. As shown in FIG. 2, document summarization network 200 may further comprise encoder block 240, decoder 210, prediction network 232, and attention network 212. Encoder block 240 may further comprise encoders 208(1)-208(N), each comprising a respective word-level LSTM 214. Encoder block 240 may also comprise section-level LSTM 216.

As shown in FIG. 2, each word-level LSTM 214 may comprise an internal state 202 that is updated during each iteration or time step. Thus, it will be understood that FIG. 2 shows an unrolled representation of each word-level LSTM 214. For example, the first word-level LSTM 214 shows the evolution of hidden state 202 from its initial state $h_{1,1}^{e,w}$ to its final state $h_{M,1}^{e,w}$ (i.e., after all M words in the section have been processed).

Prediction network 232 may further comprise feedforward network 224, pointer network 220, soft switch 238 and softmax 218. Decoder 210 may further comprise an LSTM herein referred to as decoder LSTM 234

As previously described with respect to FIG. 1, according to one embodiment of the present disclosure, each encoder 208(1)-208(N) may perform encoding of a respective section of a document by receiving words in a sequential fashion for that respective section. For example, as shown in FIG. 1, the first word-level LSTM 214 receives words $x_{1,1}$-$x_{M,1}$ (i.e., all words in the first section of the document). The last word-level LSTM 214 receives words $x_{1,N}$-$x_{M,N}$ (i.e., all words in the last section of the document). As further shown in FIG. 2, each encoder 208(1)-208(N) may further comprise respective word-level LSTM 214, which performs encoding of words in a respective section. That is, according to one embodiment of the present disclosure a respective word-level LSTM 214 is provided for each document section comprising a series of words. It will be appreciated, that each word in a document section may be represented as a vector.

According to one embodiment of the present disclosure, each word-level LSTM 214 may comprise a bidirectional LSTM that operates in a forward and backward pass. According to some embodiments of the present disclosure, word-level LSTMs 214 may be multilayer LSTMs. For example, as shown in FIG. 2, it is assumed that each word-level LSTM 214 corresponding to a document section receives M words. Thus, a first word-level LSTM 214 may process words $x_{1,1}$-$x_{M,1}$ in the first section while the Nth word-level LSTM 214 may process words $x_{1,N}$-$x_{M,N}$ in the Nth section. FIG. 2 depicts word-level LSTMs 214 in an unrolled state in which the time evolution of the internal state of section-level LSTM 214 is shown from initial state $h_{i,j}^{e,w}$-$h_{i',j'}^{e,w}$.

During each sequential step, each word-level LSTM 214 may operate to receive a next word in the respective document section it is processing and then update its own respective internal state 202 and generate a respective output (not shown in FIG. 2). In particular, according to one embodiment of the present disclosure, internal state 202 of each word-level LSTM 214 is updated upon processing of each input word in the respective section corresponding to the word-level LSTM 214. According to one embodiment of the present disclosure, internal state 202 may comprise a tensor or multidimensional array.

FIG. 2 also shows section level LSTM 216, which may also be a bidirectional LSTM. In single forward pass, the input of section level LSTM 216 will be accessible when all word-level LSTMs 214 corresponding to sections of the document (both forward and backward passes) have finished processing words in their respective sections. In particular, according to one embodiment of the present disclosure, when the word-level LSTMs 214 have finished running (i.e., they have processed all words in their respective sections), the internal state of each word-level LSTM state 202 $h_{i,j}^{e,w}$ represents an encoding or representation of the respective section.

Once the word-level LSTMs 214 have completed running, section level LSTM 216 may then commence running utilizing the internal states 202 $h_{i,j}^{e,w}$ of the respective word-level LSTMs 214 as input at each temporal step. In particular, according to one embodiment of the present disclosure, each internal state 202 of a respective word-level LSTM 214 is received in section order by section level LSTM. At each temporal step, section-level LSTM 216 updates respective internal state 202 $h_t^{e,s}$ and generates section-level LSTM output (not shown in FIG. 2). Once all the internal states of the word-level LSTMs 214 have been sequentially received and processed by section-level LSTM 216, the internal state 202 $h_t^{e,s}$ of section-level LSTM 216 comprises a document representation. FIG. 2 depicts section-level LSTM 216 in an unrolled state in which the time evolution of the internal state of section-level LSTM 216 is shown from initial state $h_1^{e,s}$-$h_N^{e,s}$.

When section-level LSTM 216 completes the processing of the internal states 202 of word-level LSTM 214, decoder 210 and prediction network 232 may commence operation whereby words are generated/predicated in a document summary. In particular, according to one embodiment of the present disclosure, initial hidden state 202 of decoder LSTM 234 is initialized to the final hidden state 202 ($h_N^{e,s}$) of section-level LSTM 216 before decoder 210 commences. At each time step, decoder LSTM 234 utilizes the previous hidden decoder state $h_{t-1}^d$, the previous predicted output word $\hat{y}_{t-1}$ and the previous context vector $c_{t-1}$ to generate decoder output 236, which is provided to prediction network 232 and in particular feedforward network 224 and soft switch 238.

Figure 3:
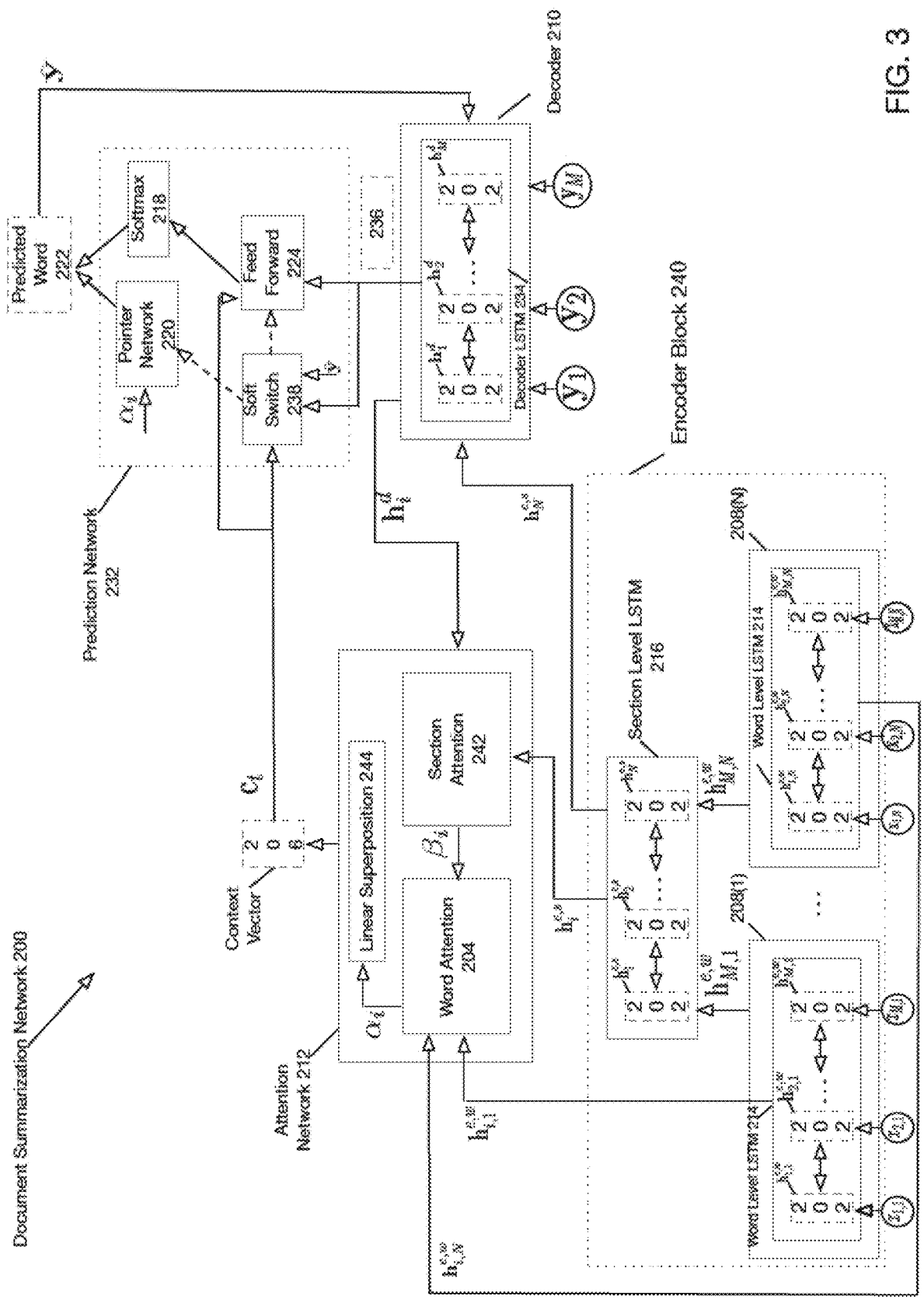

According to one embodiment of the present disclosure, attention network 212 generates context vector $c_t$ at each time step. As shown in FIG. 3, attention network may further comprise word attention block 204, section attention block 242 and linear superposition block 244. In particular, at each temporal step, attention network 212 generates context vector as a function of word-level LSTM 214 hidden states $h_{i,j}^{e,w}$ and section-level hidden states $h_t^{e,s}$, and decoder hidden states $h_t^d$. In particular, as shown in FIG. 2, decoder hidden states $h_t^d$ and section-level hidden states $h_t^{e,s}$ are received by section attention block 242 to generate section attention weights $\beta_i$ for all sections for i={1, . . . M} for a document with M sections. Word attention block 204 then receives word-level LSTM 214 hidden states $h_{i,1}^{e,w}$-$h_{i,N}^{e,w}$ to generate word attention weights $\alpha_i$ for i={1, . . . N} for all words in a section, which are provided to linear superposition block 244. Linear superposition block 244 generates context vector $c_t$ as a weighted sum of the word-level encoder hidden states $h_{i,1}^{e,w}$-$h_{i,N}^{e,w}$ using word attention weights $\alpha_i$. Context vector $c_t$, which may comprise a tensor (i.e., a multidimensional array in the context of deep learning) represents the important parts of the document relevant to decoder 210. Context vector a is then provided to feedforward network 224 in prediction network 232 as well as to decoder LSTM 234.

As shown in FIG. 2, decoder LSTM generates decoder LSTM output 236, which is provided to feedforward network 224, which may be a standard feedforward DNN in prediction network 232 as well as soft switch 238. According to one embodiment of the present disclosure, soft switch 238 determines whether the next word in the summarization should be generated or copied from the source document based upon a probability distribution function described below. If soft switch 238 determines that the next word in the summarization should be generated, decoder output 236 is provided to feedforward network 224, which generates an output (not shown) that is provided to softmax 218, which generates predicted word 222, ŷ. Alternatively, if soft switch 238 determines that based upon the probability distribution that the next word should be selected from the source document, pointer network 220 picks a word from the source document based upon the word-level attention weights $\alpha_i$ and the word from the input document having the highest weight is copied from source according to a probability distribution function described below.

As will be appreciated, softmax 218 may implement a normalized exponential function that normalizes a K-dimensional vector z of arbitrary real values to a K-dimensional vector σ(z) of real values in the range [0 . . . 1]. The function is given by:

$$\sigma: \mathbb{R}^k \to [0 \ldots 1]^k$$

$$\sigma(z)_j = \frac{e^{z_j}}{\sum_{k=1}^{K} e^{z_j}}$$

For j=1, . . . K. The output of the softmax function can be used to represent a categorical distribution—that is, a probability distribution over K different possible outcomes. In fact, it is the gradient-log-normalizer of the categorical probability distribution and is related to the Boltzmann distribution in physics.

Using softmax 218 alone, a problem emerges in which an unknown token may be predicted (i.e., a word that is not in the vocabulary). In order to address this problem, pointer network 220 may be introduced to operate as a probabilistic switch to occasionally allow copying of words directly from the source document rather than generating a new token. In particular, and as described in detail below, at each time step pointer network 220 decides whether to either generate the next word or to pick a word from the source document.

FIG. 3 is a detailed block diagram of a document summarization network according to one embodiment of the present disclosure. As shown in FIG. 3, training vectors $y_1$, $y_2$, . . . $y_M$, which may comprise an actual sequence of words in a document summarization, are provided as decoder inputs during training. According to one embodiment of the present disclosure, document summarization network 200 is trained using a backpropagation-in-time method.

LSTMs

As previously described, document summarization network may include RNNs and in particular LSTM networks. Recurrent neural networks are well understood. However, for purposes of a brief explanation, some discussion of recurrent neural networks and LSTM properties are reviewed.

Due to the fact that temporal dependencies may be many time steps apart, standard RNNs generally may suffer what is known as the exploding/vanishing gradients problem, in which the gradients computed in the backpropagation through time algorithm may become extremely large (exploding) or very small (vanishing), which leads to numerical instabilities, thereby mitigating the effectiveness of RNNs. LSTMs may address the vanishing/exploding gradients problem.

Figure 4A:
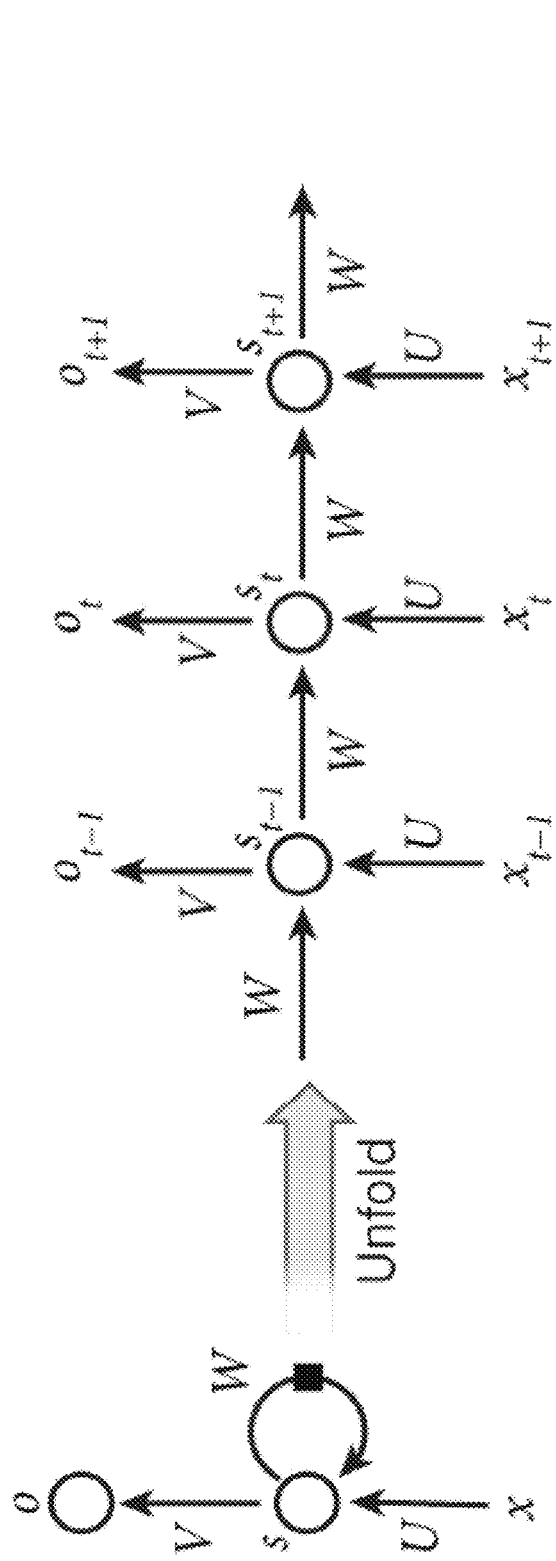
FIG. 4a depicts an operation of a recurrent neural network according to one embodiment of the present disclosure.

FIG. 4a depicts an operation of a recurrent neural network according to one embodiment of the present disclosure. Typically, recurrent neural networks ("RNNs") have the form of a chain of repeating modules of neural network. That is, the operation of a recurrent neural network may be understood as repeating a single cell indexed by time. In order to provide this recurrent behavior, recurrent neural networks may maintain a hidden state $s_t$, which is provided as input to the next iteration of the network. For purposes of this disclosure the variables $s_t$ and $h_t$ will be used interchangeably to represent the hidden state of an RNN. Thus, as shown in the left portion of FIG. 4a, a recurrent neural network may receive input from a current time sample $x_t$ as well has the hidden state $s_{t-1}/h_{t-1}$ from the previous time sample fed back to the input. The equation governing the update to the hidden state $s_t/h_t$ may be expressed as follows:

$$s_t = \phi(Ux_t + Ws_{t-1})$$

where $\phi$ is typically a non-linear function such as tanh or ReLU. The output of the recurrent neural network may be expressed as:

$$o_t = \text{softmax}(Vs_t)$$

The hidden state $s_t/h_t$ may be understood as the memory of the network. In particular, $s_t/h_t$ captures information about what happened in all the previous time steps. The output at step $o_t$ is calculated solely based on the memory at time t.

Figure 4B:
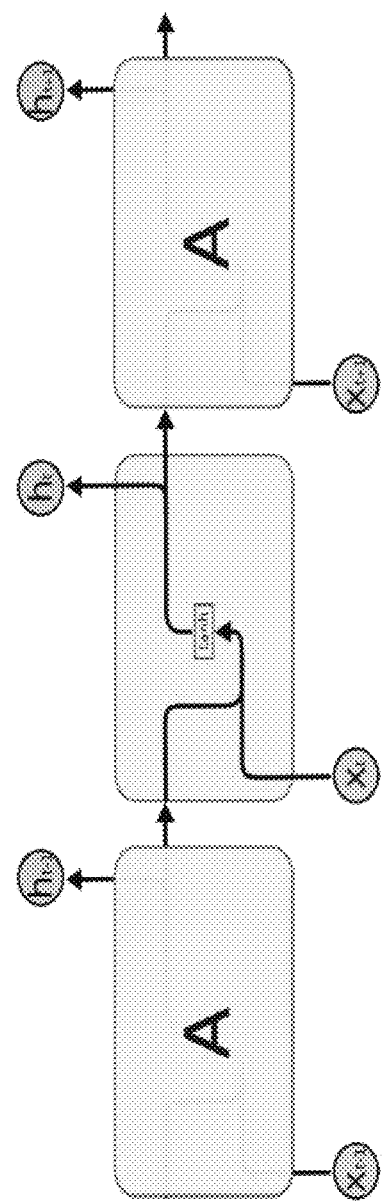
FIG. 4b depicts a more detailed example of an operation of an RNN that has been unrolled for analytical clarity.

FIG. 4b depicts a more detailed example of an operation of an RNN that has been unrolled for analytical clarity. In this diagram, $\phi$ is specifically shown as the tanh function and the linear weights U, V and W are not explicitly shown. Unlike a traditional deep neural network, which uses different parameters at each layer, an RNN shares the same parameters (U, V, W above) across all time steps. This reflects the fact that the same task is being performed at each time step, just with different inputs. This greatly reduces the total number of parameters to be learned.

Although FIGS. 4a-4b show outputs at each time step, depending on the task, this may not be necessary. For example, when predicting the sentiment of a sentence only the final output may be important, not the sentiment after each word. Similarly, inputs at each time step may not be necessary. The main feature of an RNN is its hidden state $s_t$, which captures some information about a sequence.

Figure 4C:
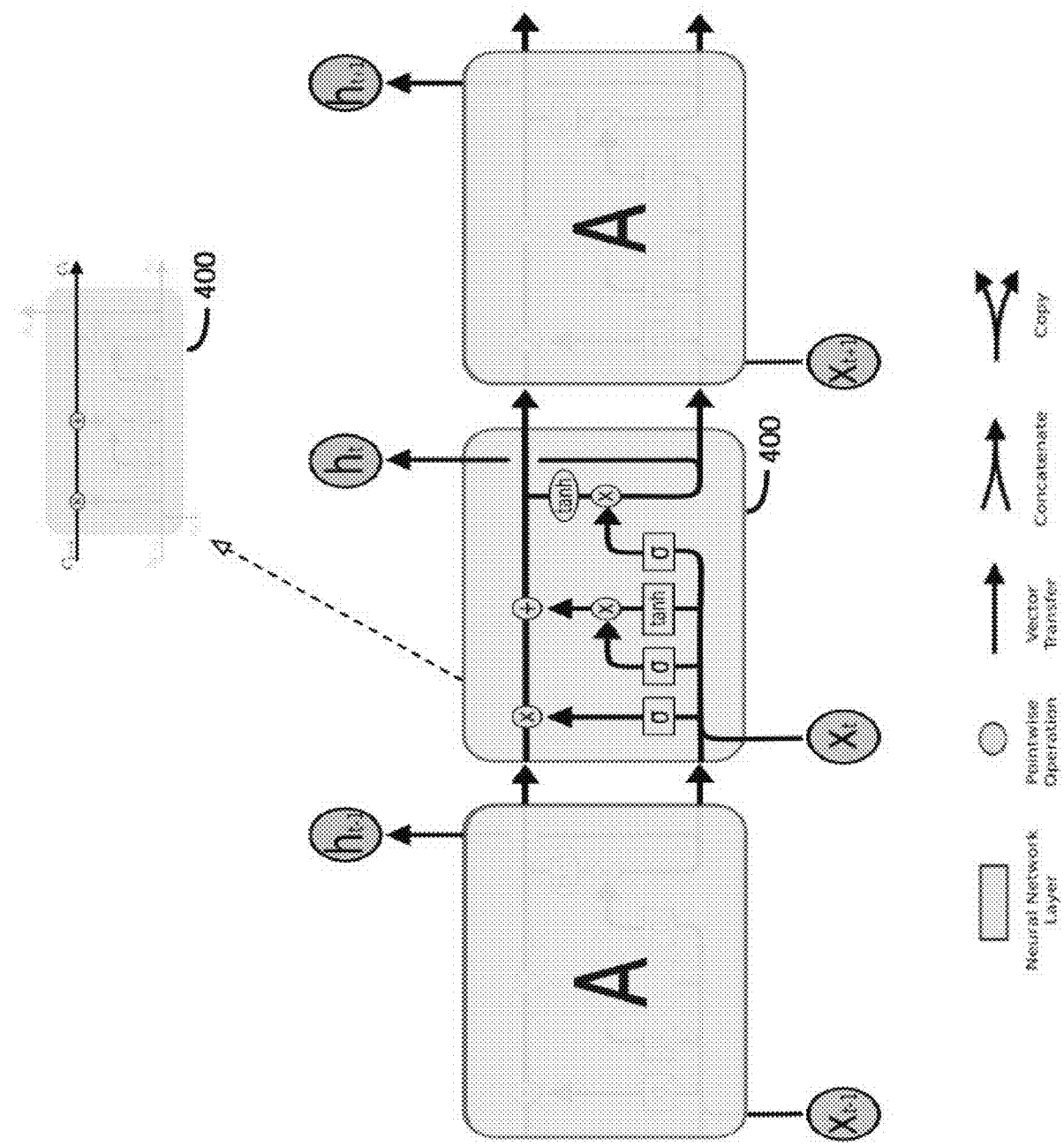
FIG. 4c depicts an operation of a long short-term memory (LSTM) cell according to one embodiment of the present disclosure.

FIG. 4c depicts an operation of an LSTM according to one embodiment of the present disclosure. An LSTM may be understood as a special kind of RNN, capable of learning long-term dependencies. In particular, an LSTM may avoid the long-term dependency problem that may be intractable with conventional RNNs due to the vanishing/exploding gradients problem. As shown in FIG. 4c, according to one embodiment of the present disclosure, an LSTM may comprise a series of cells, similar to the general RNN shown in FIGS. 4a-4b. Similar to a general RNN, each cell in the LSTM operates to compute a new hidden state for the next time step.

As shown in FIG. 4c in addition to maintaining and updating a hidden state $s_t/h_t$, an LSTM may maintain a cell state $C_t$ for a given LSTM cell 400. Further, as shown in FIG. 4c, rather than a single layer for a standard RNN such as the tanh layer shown in FIG. 4c, an LSTM may allow the capability to add or remove information from the cell using a set of gates. A gate may comprise a sigmoid function coupled to a pointwise or Hadamard product multiplication function, where the sigmoid function is:

$$\sigma = \frac{1}{1+e^{-z}}$$

and the Hadamard product is indicated by the ⊗ symbol (it may also be represented by the symbol ○). According to embodiments of the present disclosure, gates may allow or disallow the flow of information through the cell. As the sigmoid function is between 0 and 1, that function value controls how much of each component should be allowed through a gate. Referring again to FIG. 4c, it can be seen that an LSTM cell 400 may comprise 3 gates, a forget gate, an input gate and an output gate.

Figure 4D:
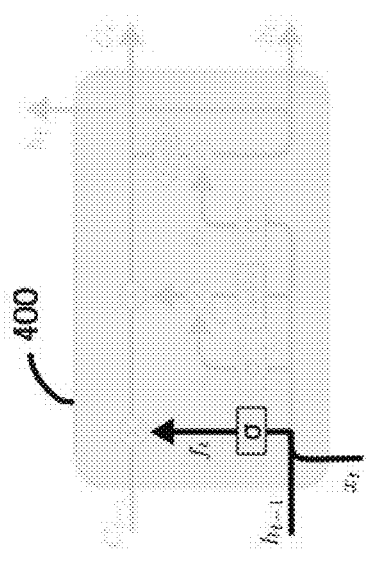
FIG. 4d shows a detailed view of a forget gate according to one embodiment of the present disclosure.

FIG. 4d shows a detailed view of a forget gate provided in LSTM cell 400 according to one embodiment of the present disclosure. The forget gate shown in FIG. 4d may determine what information to discard in the cell state based on the previous hidden state $h_{t-1}$ and the current input $x_t$. In particular, an output of the forget gate may be represented as:

$$f_t = \sigma(W_f[h_{t-1}, x_t] + b_f)$$

where $W_f$ is some scalar constant and $b_f$ is a bias term and the brackets connote concatenation.

Figure 4E:
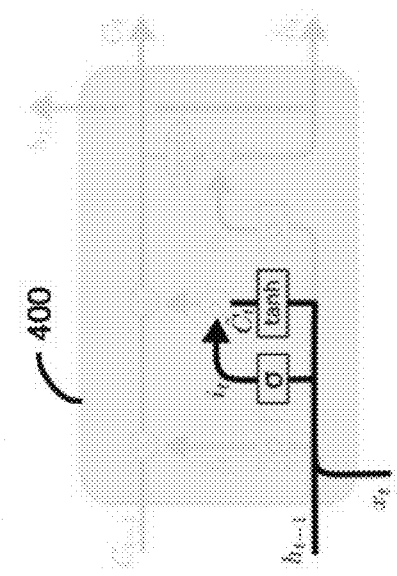
FIG. 4e depicts a first phase of an operation of an input gate according to one embodiment of the present disclosure.
Figure 4F:
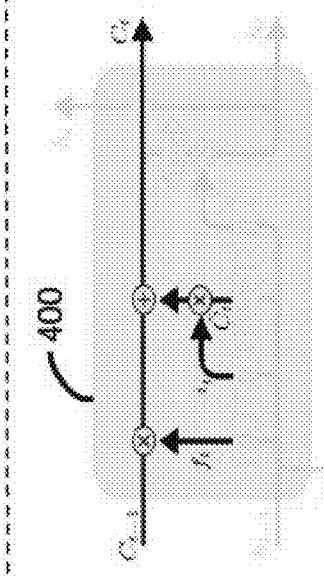
FIG. 4f depicts a second phase of an operation of an input gate according to one embodiment of the present disclosure.

FIGS. 4e-4f depict an operation of an input gate provided in LSTM cell 400 for storing information according to one embodiment of the present disclosure. According to one embodiment, this operation may be performed in two phases shown respectively in FIGS. 4e and 4f. In particular, FIG. 4e depicts a first phase operation of an input gate according to one embodiment of the present disclosure. As shown in FIG. 4e, first a sigmoid layer referred to as the "input gate layer" determines which values to update. Next a tank layer may create a vector of new candidate values $\tilde{C}_t$ that may be added to the state. These operations may be expressed by the following relations:

$$i_t = \sigma(W_i[h_{t-1}, x_t] + b_i)$$

$$\tilde{C}_t = \tanh(W_c[h_{t-1}, x_t] + b_c)$$

FIG. 4f depicts a second phase of an operation of an input gate provided in LSTM cell 400 according to one embodiment of the present disclosure. As shown in FIG. 4f, the old state $C_{t-1}$ may be multiplied by $f_t$ to cause the forgetting of information (as determined in FIG. 4d). Next, the new candidate values $i_t \otimes \tilde{C}_t$ are added to the previous cell state $C_{t-1}$. This may be expressed by the relation:

$$C_t = f_t \otimes C_{t-1} + i_t \otimes \tilde{C}_t$$

Figure 4G:
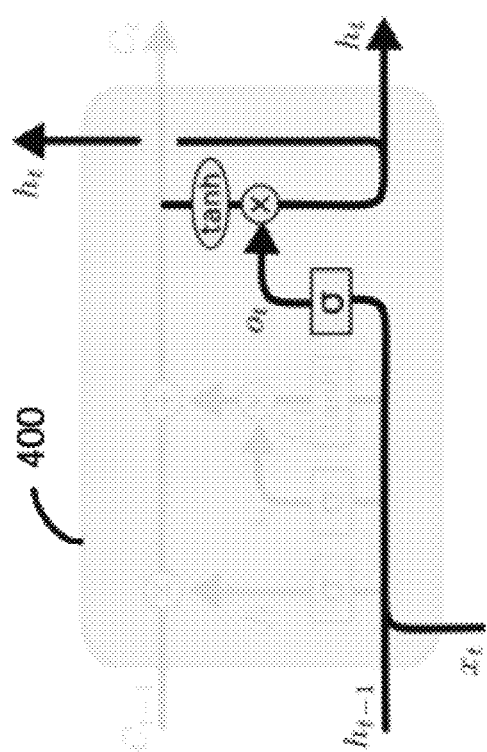
FIG. 4g depicts an operation of an output gate according to one embodiment of the present disclosure.

FIG. 4g depicts an operation of an output gate provided in LSTM cell 400 according to one embodiment of the present disclosure. According to one embodiment of the present disclosure, the output may be based on the cell state $C_t$, but may be filtered. In particular, according to one embodiment, first, a sigmoid layer may be applied that decides what parts of the cell state $C_t$ to output. Next the cell state $C_1$ may be processed through a tanh function (to cause the values to be between −1 and 1) and then multiplied by the output of the sigmoid gate, to selectively output only the parts that were decided to output. The operation of an output gate may be expressed by the relations:

$$o_t = \sigma(W_o[h_{t-1}, x_t] + b_o)$$

$$h_t = o_t \otimes \tanh(C_t)$$

The structure of LSTM cell 400 depicted in FIGS. 4c-4g is only one example. According to other embodiments, for example, a gated recurrent unit ("GRU") may be used or some other variant. In addition, the internal structure of the LSTM cell 400 shown in FIGS. 4c-4g may be modified in a multitude of ways, for example, to include peephole connections, for example.

According to one embodiment of the present disclosure, each encoder 208(1)-208(N) may be an RNN (e.g., an LSTM) that collectively captures a document's discourse structure. Each discourse section is separately encoded by a corresponding encoder (208(1)-208(N)) such that the entire document is encoded. In particular, according to one embodiment of the present disclosure, a document D may be encoded as a vector d according to the following relationship:

$$d = RNN_{doc}(\{s_1, \ldots, s_N\})$$

where N is the number of sections in the document and $s_i$ is the representation of a section in the document consisting of a sequence of tokens $x_i$:

$$s_i = RNN_{sec}(\{x_{(i,1)}, \ldots, x_{(i,M)}\})$$

where M is the maximum sequence length.

RNN(.) denotes a function which is a recurrent neural network whose output is a vector representing the input sequence. According to one embodiment of the present disclosure, the parameters of $RNN_{sec}$ are shared for all the discourse sections. According to one embodiment of the present disclosure, a single layer bidirectional LSTM is used for $RNN_{doc}$ and $RNN_{sec}$. According to alternative embodiments multilayer LSTMs may be utilized.

Neural Attention Mechanism

According to one embodiment of the present disclosure, at each decoding time step, in addition to the words in the document, attention is provided to the relevant discourse sections. Discourse related information is utilized to modify the word-level attention function. In particular, according to one embodiment of the present disclosure, a context vector representing the source document is generated as follows:

$$c_t = \sum_{j=1}^{N} \sum_{i=1}^{M} \alpha_{(j,i)}^{(t)} h_{(j,i)}^{(e)}$$

where $h_{(j,i)}^{(e)}$ shows the encoder output of token i in discourse section j and $\alpha_{(j,i)}^{(t)}$ shows the corresponding weight to that encoder state. The weights $\alpha_{(j,i)}^{(t)}$ may be obtained according to:

$$\alpha_{(j,i)}^{(t)} = \text{softmax}(\beta_j^{(t)} \text{score}(h_{(j,i)}^{(e)}, h_{t-1}^{(d)}))$$

According to one embodiment of the present disclosure, the score function is defined in an additive manner as follows:

$$\text{score}(h_{(j,i)}^{(e)}, h_{t-1}^{(d)}) = v_\alpha^T \tanh(\text{linear}(h_{(j,i)}^{(e)}, h_{t-1}^{(d)}))$$

where linear is a function that outputs a linear mapping of its arguments.

The weights $\beta_j^{(t)}$ are updated according to:

$$\beta_j^{(t)} = \text{softmax}(\text{score}(s_1, h_{t-1}^{(d)}))$$

Decoder

According to one embodiment of the present disclosure, at each time step t, the decoder input $x'_t$, the previous decoder state $h_{t-1}^{(d)}$ and the context vector $c_t$ are used to estimate the probability distribution for the next word $y_t$:

$$p(y_t|y_{1:t-1}) = \text{softmax}(V^T \text{linear}(h_{t-1}^{(d)}, c_t, x'_t))$$

where V is a vocabulary weight matrix and linear is a linear mapping function.

Copying from Source

According to one embodiment of the present disclosure, an additional binary variable $z_t$ is added to the decoder indicating generating a word from the vocabulary ($z_t$=0) or copying a word from the source ($z_t$=1). The probability may be learned during training as follows:

$$p(z_t=1|y_{1:t-1}) = \sigma(\text{linear}(h_{t-1}^{(d)}, c_t, x'_t))$$

Then, the next word $y_t$ may be generated according to:

$$p(z_t = 1 \mid y_{1:t-1}) = \sum_z p(y_t, z_t = z \mid y_{1:t-1}); z = \{0, 1\}$$

The joint probability is decomposed as:

$$p_c(y_t = x_l \mid y_{l:t-1}) = \begin{cases} p_c(y_t \mid y_{1:t-1}) p(z_t = z \mid y_{1:t-1}) \\ p_g(y_t \mid y_{1:t-1}) p(z_t = z \mid y_{1:t-1}) \end{cases}$$

$p_g$ is the probability of generating a word from the vocabulary and is defined according to:

$$p(z_t=1|y_{1:t-1}) = \sigma(\text{linear}(h_{t-1}^{(d)}, c_t, x'_t))$$

$p_c$ is the probability of copying a word from the source vector x and is defined as the sum of the word's attention weights. In particular, the probability of copying a word $x_l$ is defined as:

$$p_c(y_t=x_l|y_{l:t-1}) = \Sigma_{(j,i):x_{(j,i)}=x_l} \alpha_{(j,i)}^t$$

Decoder Coverage

In long sequences the neural generation model described above tends to repeat phrases where softmax 218 predicts the same phrase multiple times over multiple time steps. In order to address this issue, according to one embodiment of the present disclosure, attention coverage is tracked to prevent repeatedly attending to the same time steps. According to one embodiment of the present disclosure, a coverage vector $cov^t$ may be defined as the sum of attention weight vectors at previous time steps:

$$cov^t = \sum_{k=0}^{t-1} \alpha^k$$

The coverage also implicitly includes information about the attended document discourse sections. According to one embodiment of the present disclosure, decoder coverage may be incorporated as an additional input to the attention function:

$$\alpha_{(j,i)}^{(t)} = \text{softmax}(\beta_j^{(t)} \text{score}(h_{(j,i)}^{(e)}, \text{cov}_{(j,i)}^t, h_{t-1}^{(d)}))$$

Training

Example of Generated Summary

The following shows an example summarization using techniques of the present disclosure compared with Pntr-Gen-Seq2Seq as well as showing the actual abstract.

Abstract: in this paper, the author proposes a series of multilevel double hashing schemes called cascade hash tables. they use several levels of hash tables. in each table, we use the common double hashing scheme. higher level hash tables work as fail—safes of lower level hash tables. by this strategy, it could effectively reduce collisions in hash insertion. Thus, it gains a constant worst case lookup time with a relatively high load factor(@xmath0) in random experiments. different parameters of cascade hash tables are tested.

Pntr-Gen-Seq2Seq: hash table is a common data structure used in large set of data storage and retrieval. it has an o(1) lookup time on average.is the size of the hash table. we present a set of hash table schemes called cascade hash tables. hash table data structures which consist of several of hash tables with different size.

Present method: cascade hash tables are a common data structure used in large set of data storage and retrieval. such a time variation is essentially caused by possibly many collisions during keys hashing. in this paper, we present a set of hash schemes called cascade hash tables which consist of several levels(@xmath2) of hash tables with different size. after constant probes, if an item can't find a free slot in limited probes in any hash table, it will try to find a cell in the second level, or subsequent lower levels. with this simple strategy, these hash tables will have descendant load factors, therefore lower collision probabilities.

Experiments and Results

The following table shows statistics of datasets utilized for comparison of summarization techniques using techniques described in this disclosure as well as alternative techniques.

| Datasets | # Docs | Avg Doc Length (Words) | Avg. Summary Length (Words) |
|---|---|---|---|
| CNN (Nallapati et al., 2016) | 92K | 656 | 43 |
| Daily Mail (Nallapati et al., 2016) | 219K | 693 | 52 |
| NY Times (Paulus et al., 2017) | 655K | 530 | 38 |
| arXiv (Present Method) | 194K | 4938 | 220 |

Techniques described in the present disclosure for performing document summarization are compared with alternative methods including: LexRank (Erkan and Radev, 2004), Sum-Basic (Vanderwende et al., 2007), LSA (Steinberger and Ježek, 2004), Attn-Seq2Seq (Nallapati et al., 2016; Chopra et al., 2016), and Pntr-Gen-Seq2Seq (See et al., 2017). The first three are extractive models and last two are abstractive. Pntr-Gen-Seq2Seq extends Attn-Seg2Seq by using a joint pointer network in decoding. For Pntr-Gen-Seq2Seq results were generated utilizing the reported hyperparameters in those works to ensure that the result differences are not due to hyperparameter tuning. The following tables show the main results of comparison:

| Summarizer | RG-1 | RG-2 | RG-3 | RG-L |
|---|---|---|---|---|
| SumBasic | 29.47 | 6.95 | 2.36 | 26.30 |
| LexRank | 33.85 | 10.73 | 4.54 | 28.99 |
| LSA | 29.91 | 7.42 | 3.12 | 25.67 |
| Attn-Seq2Seq | 29.30 | 6.00 | 1.77 | 25.56 |
| Pntr-Gen-Seq2Seq | 32.06 | 9.04 | 2.15 | 25.16 |
| Present Method | 35.80 | 11.05 | 3.62 | 31.80 |

Techniques described in the present disclosure significantly outperform both extractive and abstractive models, showing their effectiveness. Notably, the ROUGE-1 score using techniques of the present disclosure is respectively about 4 points higher than the abstractive model Pntr-Gen-Seq2Seq for the arXiv dataset, providing a significant improvement. This shows that techniques described in the present disclosure are effective for abstractive summarization of longer documents. The most competitive baseline method is LexRank, which is extractive.

Because extractive methods copy salient sentences from the document, it is usually easier for extractive methods to achieve better ROUGE scores in larger n-grams. Nevertheless, methods described in the present disclosure effectively outperform LexRank. It can be observed that the state-of-the-art Pntr-Gen-Seq2Seq model generates a summary that mostly focuses on introducing the problem. However, using the model described in the present disclosure generates a summary that includes more information about theme and impacts of the target paper. This shows that the context vector in the model described in the present disclosure compared with Pntr-Gen-Seq2Seq is better able to capture important information from the source by attending to various discourse sections.

Figure 5A:
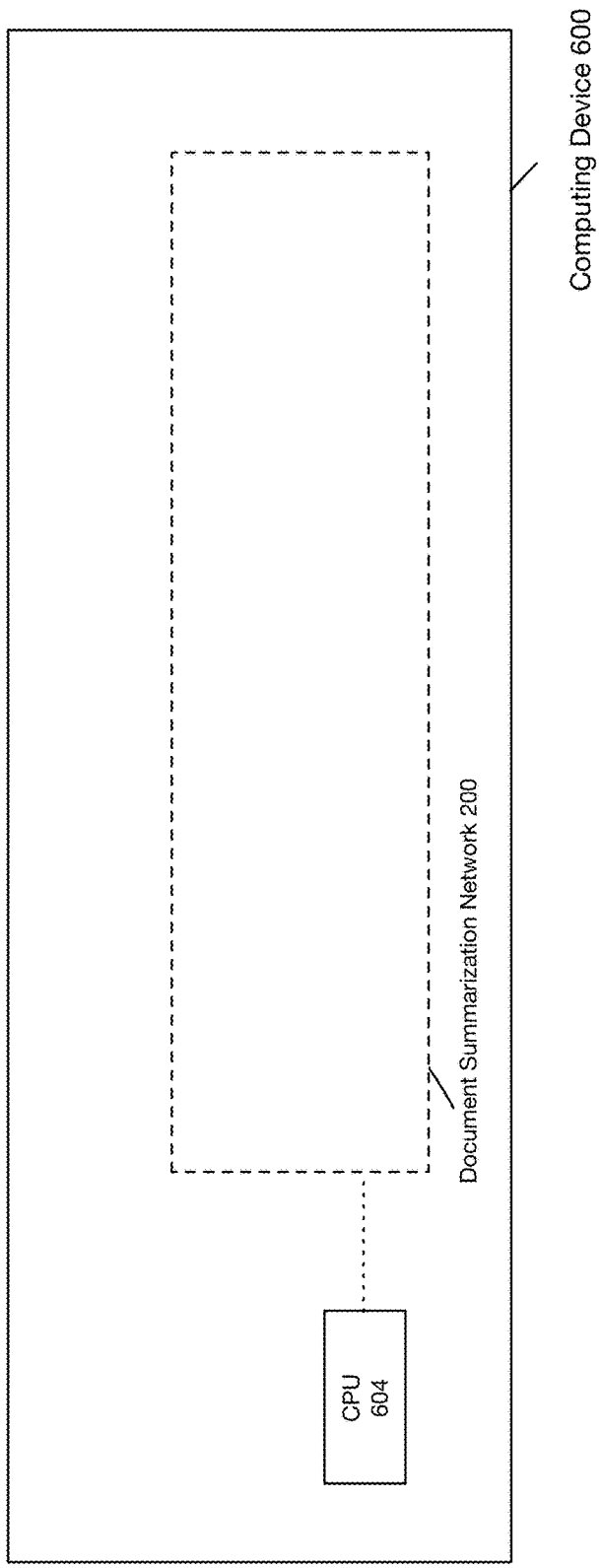
FIG. 5a illustrates an example computing system that executes a document summarization network according to one embodiment of the present disclosure.

FIG. 5a illustrates an example computing system that executes document summarization network according to one embodiment of the present disclosure. As depicted in FIG. 5a, computing device 600 may include CPU 604 that executes one or more processes to perform document summarization. In particular, CPU 604 may be further configured via programmatic instructions to execute document summarization network 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 600 can be any stand-alone computing platform, such as a desk top or work station computer, laptop computer, tablet computer, smart phone or personal digital assistant, game console, set-top box, or other suitable computing platform.

Figure 5B:
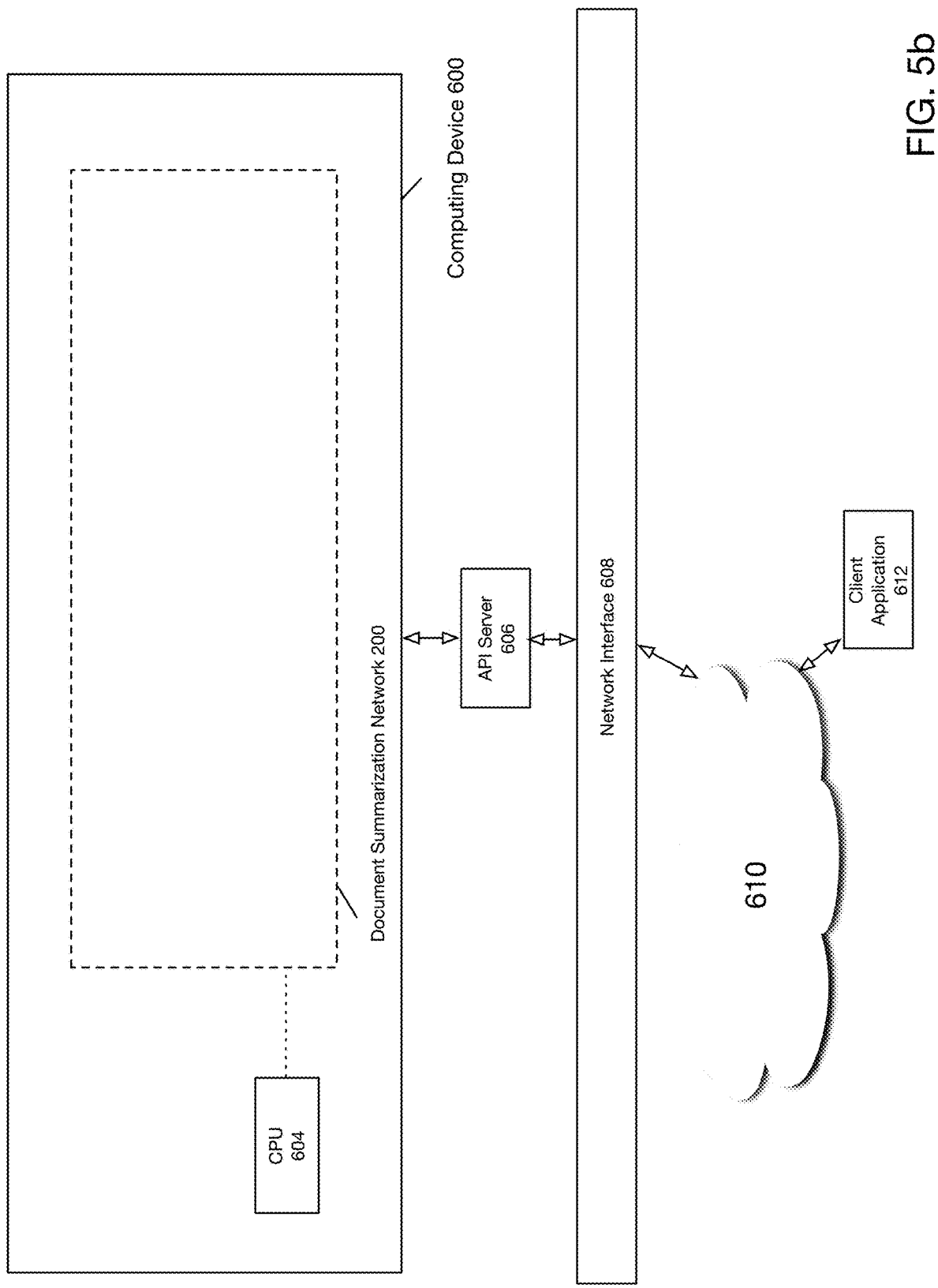
FIG. 5b illustrates an example integration of a document summarization network into a network environment according to one embodiment of the present disclosure.

FIG. 5b illustrates an example integration of a document summarization network into a network environment according to one embodiment of the present disclosure. As depicted in FIG. 5b, computing device 600 may be collocated in a cloud environment, data center, local area network ("LAN") etc. Computing device 600 shown in FIG. 5b is structured identically to the example embodiment described with respect to FIG. 5a. As shown in FIG. 5b, client application 612 may interact with computing device 600 via network 610. In particular, client application 612 may make requests and receive responses via API calls received at API server 606, which are transmitted via network 610 and network interface 608.

It will be understood that network 610 may comprise any type of public or private network including the Internet or LAN. It will be further readily understood that network 610 may comprise any type of public and/or private network including the Internet, LANs, WAN, or some combination of such networks. In this example case, computing device 600 is a server computer, and client application 612 may be any typical personal computing platform As will be further appreciated, computing device 600, whether the one shown in FIG. 5a or 5b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for generating a summarization of a structured document including a plurality of sections, the method comprising processing each word in a plurality of words included in a section using a respective first recurrent neural network to generate a respective word-level representation, processing each respective word-level representation by a second recurrent neural network to generate a section-level representation, generating a context vector by performing a neural attention process on one or more hidden states of said first recurrent neural network and one or more hidden states of said second recurrent neural network, and, generating a next predicted word in said summarization based upon a previously predicted word in said summarization and said context vector.

Example 2 is the method of Example 1, wherein said context vector is generated by forming a weighted linear combination of hidden states of said first recurrent neural network.

Example 3 is the method of Example 1, wherein generating a next predicted word in said summarization comprises processing said context vector and said previously predicted word by a third recurrent neural network to generate a decoded representation, processing said decoded representation by a feedforward network to generate a first output, and, processing said first output by a softmax network to generate said next predicted word.

Example 4 is the method of Example 3, wherein said third recurrent neural network is initialized by setting an internal state of said third network to a final state of said second recurrent neural network.

Example 5 is the method of Example 1, wherein each word in said plurality of words included in said section is represented as a vector.

Example 6 is the method of Example 5, wherein generating a next predicted word in said summarization further comprises processing said context vector and said previously predicted word through a fourth recurrent neural network, wherein said fourth recurrent neural network generates a first output, processing said output through a feed forward network to generate a second output, and, processing said second output through a softmax network to generate said predicted next word.

Example 7 is the method of Example 6, wherein said context vector and said previously predicted word are concatenated prior to processing via said fourth recurrent neural network.

Example 8 is a system for generating a summarization of a structured document including a plurality of sections, the system comprising a word-level LSTM corresponding to a respective one of said sections, wherein said respective word-level LSTM processes each word in said respective section to generate a respective word-level representation, a section-level LSTM, wherein said section-level LSTM processes said respective word-level representation for said respective section to generate a section-level representation, an attention network, wherein said attention generates a context vector by performing a neural attention process on outputs of said LSTM and, a prediction network, wherein said prediction network generates a next predicted word in said summarization based upon a previously predicted word in said summarization and said context vector.

Example 9 is the system according to Example 8, wherein said word-level and section-level LSTMs are part of an encoder, and said prediction network comprises a decoder, wherein said decoder comprises a decoder LSTM, a feed forward network, and, a softmax network.

Example 10 is the system according to Example 8, wherein said context vector is generated by forming a weighted linear combination of outputs of said word-level LSTMs.

Example 11 is the system according to Example 9, wherein said decoder LSTM processes said context vector and said previously predicted word to generate a decoded representation, said feedforward network processes said decoded representation to generate a first output, and, said softmax processes said first output to generate said next predicted word.

Example 12 is the system according to Example 9, further comprising a soft switch, wherein said soft switch selectively determines whether a pointer network or softmax network are utilized to output a next predicted word.

Example 13 is the system according to Example 12, wherein said pointer network selects a word from a source document based upon a probability distribution.

Example 14 is the system according to Example 12, wherein said softmax network generates a predicted word from a vocabulary, wherein said next predicted word has a largest probability of all words in said vocabulary.

Example 15 is a computer program product including one or more non-transitory machine-readable mediums encoded with instructions that when executed by one or more processors cause a process to be carried out for performing summarization of a structured document including a plurality of sections comprising, the method comprising processing each word in a plurality of words included in a section using a respective first recurrent neural network to generate a respective word-level representation, processing each respective word-level representation by a second recurrent neural network to generate a section-level representation, generating a context vector by performing a neural attention process on one or more hidden states of said first recurrent neural network and one or more hidden states of said second recurrent neural network, and, generating a next predicted word in said summarization based upon a previously predicted word in said summarization and said context vector.

Example 16 is the computer program product according to Example 15, wherein said context vector is generated by forming a weighted linear combination of hidden states of said first recurrent neural network.

Example 17 is the computer program product according to Example 15, wherein generating a next predicted word in said summarization further comprises processing said context vector and said previously predicted word by a third recurrent neural network to generate a decoded representation, processing said decoded representation by a feedforward network to generate a first output, and, processing said first output by a softmax network to generate said predicted word.

Example 18 is the computer program product according to Example 17, wherein said third recurrent neural network is initialized by setting an internal state of said third network to a final state of said second recurrent network.

Example 19 is the computer program product according to Example 15, wherein each word in said plurality of words included in said section is represented as a vector.

Example 20 is the computer program product according to Example 19, wherein generating a predicted next word in said summarization further comprises processing said context vector and said previously predicted word through a fourth recurrent neural network, wherein said fourth recurrent network generates a first output, processing said output through a feedforward neural network to generate a second output, and processing said second output through a softmax network to generate said predicted next word.

What is claimed is:

1. A method for abstractive summarization of a document, the method comprising:
    receiving a document comprising a plurality of sections, each of which comprises a plurality of words;
    sequentially processing each word in a first one of said sections using a respective first word-level recurrent neural network to generate a respective first word-level representation of said first section;
    sequentially processing each word in a second one of said sections using a respective second word-level recurrent neural network to generate a respective second word-level representation of said second section;
    after words in said first and second sections are processed using said respective first and second word-level recurrent neural networks, sequentially processing said first and second word-level representations by a section-level recurrent neural network to generate a section-level representation of at least said first and second sections;
    generating, by an attention network, section attention weights for at least said first and second sections that takes as input (a) hidden states of said section-level recurrent neural network that represent at least said first and second sections and (b) hidden states of a decoder that is initialized to a final hidden state of said section-level recurrent neural network;
    generating, by said attention network, a context vector by performing a neural attention process that takes as input (a) hidden states of said first word-level recurrent neural network that represent said first section, (b) hidden states of said second word-level recurrent neural network that represent said second section, and (c) said section attention weights; and
    generating a next predicted word in an abstractive summarization of said document based upon a previously predicted word in said abstractive summarization and said context vector.

2. The method according to claim 1, wherein said context vector is generated by forming a weighted linear combination of hidden states of said first word-level recurrent neural network.

3. The method according to claim 1, wherein generating said next predicted word in said abstractive summarization comprises:
    processing, by a feedforward network, said context vector generated by said attention network and a decoder output generated by said decoder, wherein said processing by said feedforward network is performed to generate a first output; and
    processing said first output by a softmax network to generate said next predicted word.

4. The method according to claim 3, further comprising selectively determining, using a soft switch, whether a pointer network or said softmax network is used to output said next predicted word.

5. The method according to claim 1, wherein each word in said first section is represented as a vector.

6. The method according to claim 5, wherein generating said next predicted word in said abstractive summarization comprises:
    processing said context vector and said previously predicted word through a third recurrent neural network, wherein said third recurrent neural network generates a first output;
    processing said first output through a feedforward network to generate a second output; and
    processing said second output through a softmax network to generate said next predicted word.

7. The method according to claim 6, wherein said context vector and said previously predicted word are concatenated prior to processing via said third recurrent neural network.

8. A system for generating an abstractive summarization of a structured document including a plurality of sections, the system comprising a processor coupled to a memory device having stored therein:
    a first word-level LSTM corresponding to a respective first one of said sections, wherein said first word-level LSTM processes each word in said respective first section to generate a respective first word-level representation of said first section;
    a second word-level LSTM corresponding to a respective second one of said sections, wherein said second word-level LSTM processes each word in said respective second section to generate a respective second word-level representation of said second section;
    a section-level LSTM, wherein said section-level LSTM sequentially processes said first and second word-level representations to generate a section-level representation of at least said first and second sections, and wherein said section-level LSTM sequentially processes said first and second word-level representations after words in said first and second sections are processed using said respective first and second word-level LSTMs;
    an attention network,
        wherein said attention network generates section attention weights for at least said first and second sections, said attention network taking as input (a) hidden states of said section-level LSTM that represent at least said first and second sections and (b) hidden states of a decoder that is initialized to a final hidden state of said section-level LSTM, and
        wherein said attention network further generates a context vector by performing a neural attention process, said attention network taking as input (a) hidden states of said first word-level LSTM that represent said first section, (b) hidden states of said second word-level LSTM that represent said second section, and (c) said section attention weights; and
    a prediction network, wherein said prediction network generates a next predicted word in said abstractive summarization based upon a previously predicted word in said abstractive summarization and said context vector.

9. The system according to claim 8, wherein:
    said first word-level LSTM, said second word-level LSTM, and said section-level LSTM are part of an encoder; and said prediction network comprises said decoder, a feedforward network, and a softmax network.

10. The system according to claim 8, wherein said context vector is generated by forming a weighted linear combination of outputs of said first and second word-level LSTMs.

11. The system according to claim 9, wherein:
said feedforward network processes said context vector generated by said attention network and a decoder output generated by said decoder, wherein said processing by said feedforward network is performed to generate a first output; and
said softmax network processes said first output to generate said next predicted word.

12. The system according to claim 9, wherein said memory device also has stored therein a soft switch that selectively determines whether a pointer network or said softmax network are utilized to output said next predicted word.

13. The system according to claim 12, wherein said pointer network selects a word from said structured document based upon a probability distribution.

14. The system according to claim 12, wherein:
said softmax network generates said next predicted word from a vocabulary; and
said next predicted word has a largest probability of all words in said vocabulary.

15. A computer program product including one or more non-transitory machine-readable mediums encoded with instructions that when executed by one or more processors cause a process to be carried out for summarizing a structured document comprising a plurality of sections, each of which comprises a plurality of words, the process comprising:
sequentially processing each word in a first one of said sections using a respective first word-level recurrent neural network to generate a respective first word-level representation of said first section;
sequentially processing each word in a second one of said sections using a respective second word-level recurrent neural network to generate a respective second word-level representation of said second section;
after words in said first and second sections are processed using said respective first and second word-level recurrent neural networks, sequentially processing said first and second word-level representations by a section-level recurrent neural network to generate a section-level representation of at least said first and second sections;
generating, by an attention network, section attention weights for at least said first and second sections, said attention network taking as input (a) hidden states of said section-level recurrent neural network that represent at least said first and second sections and (b) hidden states of a decoder that is initialized to a final hidden state of said section-level recurrent neural network;
generating, by said attention network, a context vector by performing a neural attention process that takes as input (a) hidden states of said first word-level recurrent neural network that represent said first section, (b) hidden states of said second word-level recurrent neural network that represent said second section, and (c) said section attention weights; and
generating a next predicted word in an abstractive summarization of said structured document based upon a previously predicted word in said abstractive summarization and said context vector.

16. The computer program product according to claim 15, wherein said context vector is generated by forming a weighted linear combination of hidden states of said first word-level recurrent neural network.

17. The computer program product according to claim 15, wherein generating said next predicted word in said abstractive summarization further comprises:
processing, by a feedforward network, said context vector generated by said attention network and a docoder output generated by said decoder, wherein said processing by said feedforward network is performed to generate a first output; and
processing said first output by a softmax network to generate said next predicted word.

18. The computer program product according to claim 17, wherein said process to be carried out for summarizing a structured document further comprises selectively determining, using a soft switch, whether a pointer network or said softmax network is used to output said next predicted word.

19. The computer program product according to claim 15, wherein each word in said first section is represented as a vector.

20. The computer program product according to claim 19, wherein generating said next predicted word in said abstractive summarization comprises:
processing said context vector and said previously predicted word through a third recurrent neural network, wherein said third recurrent network generates a first output;
processing said first output through a feedforward neural network to generate a second output; and
processing said second output through a softmax network to generate said next predicted word.

* * * * *